United States Patent
Hanson et al.

(10) Patent No.: US 11,929,093 B2
(45) Date of Patent: Mar. 12, 2024

(54) OVERLAPPING PROCESSING OF DATA TRACKS

(71) Applicant: Western Digital Technologies, Inc., San Jose, CA (US)

(72) Inventors: Weldon M. Hanson, Rochester, MN (US); Niranjay Ravindran, Rochester, MN (US); Richard Galbraith, Rochester, MN (US); Iouri Oboukhov, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 101 days.

(21) Appl. No.: 17/700,893

(22) Filed: Mar. 22, 2022

(65) Prior Publication Data
US 2023/0307000 A1    Sep. 28, 2023

(51) Int. Cl.
*H03M 13/00*    (2006.01)
*G11B 20/18*    (2006.01)

(52) U.S. Cl.
CPC ...... *G11B 20/1833* (2013.01); *G11B 20/1816* (2013.01); *G11B 20/1889* (2013.01); *G11B 2020/183* (2013.01); *G11B 2020/1853* (2013.01)

(58) Field of Classification Search
CPC ............ G11B 20/1833; G11B 20/1816; G11B 20/1889; G11B 2020/183; G11B 2020/1853
See application file for complete search history.

(56) References Cited

U.S. PATENT DOCUMENTS

| 4,502,082 A | 2/1985 | Ragle et al. |
| 5,835,299 A | 11/1998 | Lee et al. |

(Continued)

FOREIGN PATENT DOCUMENTS

| CN | 1128386 | 8/1996 |
| JP | 2009187620 A | 8/2009 |

OTHER PUBLICATIONS

Nilchim, "Write Encroachment Detection in Shingle Magnetic Recording Using Feed-Forward Position Error Signal from Adjacent Track," Asian Institute of Technology School of Engineering and Technology, Thailand, May 2015, 61 pgs., available online at https://rb.gy/qdxc5t.

(Continued)

*Primary Examiner* — Christine T. Tu
(74) *Attorney, Agent, or Firm* — PATENT LAW WORKS LLP

(57) ABSTRACT

Example read channel circuits, data storage devices, and methods to provide overlapping processing of data tracks are described. The data storage device may include media configured with a plurality of tracks in a concentric or continuous pattern. The read signal for a data track may be processed using error correction codes (ECC) as it is read during a first track read operation period. Some portion of its data sectors may need additional ECC postprocessing after the first track is initially received and processed by the read channel circuit. While the read signal for a next data track is being read and processed, the read channel circuit may continue postprocessing of the portion of data sectors from the first track during the second track read operations. Various decision parameters for managing the data stream, additional postprocessing time, and rereading tracks for data recovery are also described.

21 Claims, 7 Drawing Sheets

(56) References Cited

U.S. PATENT DOCUMENTS

| | | | |
|---|---|---|---|
| 6,577,561 B2 | 6/2003 | Pirot | |
| 8,885,277 B1 * | 11/2014 | Erden | G11B 20/1403 |
| | | | 360/39 |
| 8,976,477 B1 | 3/2015 | Hwang et al. | |
| 9,208,810 B1 | 12/2015 | Nie et al. | |
| 9,489,260 B1 | 11/2016 | Hong et al. | |
| 9,632,863 B2 | 4/2017 | Galbraith et al. | |
| 9,837,115 B1 * | 12/2017 | Sridhara | G11B 5/012 |
| 9,922,678 B2 | 3/2018 | Burd et al. | |
| 9,946,599 B1 | 4/2018 | Burd | |
| 10,284,230 B2 | 5/2019 | Yamamoto | |
| 10,530,390 B2 * | 1/2020 | Oboukhov | G06F 3/0619 |
| 11,157,364 B1 * | 10/2021 | Rice | G11B 5/5578 |
| 2005/0078395 A1 | 4/2005 | Chu et al. | |
| 2013/0114159 A1 | 5/2013 | Szita | |

OTHER PUBLICATIONS

NVIDIA Corporation, "NVIDIA Tesla V100 GPU: The World's Most Advanced Data Center GPU," NVIDIA Corporation Volta Architecture Whitepaper, Aug. 2017, available online at https://images.nvidia.com/content/volta-architecture/pdf/volta-architecture-whitepaper.pdf, 58 pgs.

* cited by examiner

OVERLAPPING PROCESSING OF DATA TRACKS

TECHNICAL FIELD

The present disclosure relates to read/write channel circuits for data storage devices. In particular, the present disclosure relates to read/write channels enabled for overlapping processing of multiple tracks.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced tracks for recording user data sectors and servo sectors. In some configurations, referred to as concentric track, the radially spaced data tracks comprise concentric rings with starting and ending positions in the same ring, sometimes including one or more parity sectors at the end of the track. In some configurations, referred to as spiral track, the radially spaced data tracks comprise at least one continuous spiral comprising multiple data tracks and multiple revolutions of the disk, with track starting and ending positions at selected points along the spiral. The servo sectors comprise head positioning information (e.g., a track address) which is read by the head and processed by a servo control system to control the actuator arm as it seeks from track to track. The magnetic disk acts as a non-volatile storage medium for storing data.

FIG. 1 shows a prior art disk format 2 as comprising a number of servo tracks 4 defined by servo sectors $6_0$-$6_N$ recorded around the circumference of each servo track. In some configurations, each servo sector comprises a preamble for storing a periodic pattern, which allows proper gain adjustment and timing synchronization of the read signal, and a sync mark for storing a special pattern used to symbol synchronize to a servo data field. The servo data field stores coarse head positioning information, such as a servo track address, used to position the head over a target data track during a seek operation. Each servo sector $6_i$ further comprises groups of servo bursts (e.g., N and Q servo bursts), which are recorded with a predetermined phase relative to one another and relative to the servo track centerlines. The phase-based servo bursts provide fine head position information used for centerline tracking while accessing a data track during write/read operations.

FIG. 2 shows a prior art mechanical configuration for a hard disk drive (HDD) 200 comprising a spindle 202 that holds a plurality of platters 204. Each platter 204 has at least one magnetic surface 206, such as a magnetic surface formatted similarly to disk format 2 in FIG. 1. Magnetic surface 206 may be configured to have digitally encoded data stored thereon as magnetized domains. A head 208 may be mounted at the end of an arm 210 controlled by an actuator 212. A read element 214 may be configured to detect magnetized portions of magnetic surface 206 and generate an analog read signal. A write element 216 may be configured to generate a timed write field to write (or erase) magnetized portions of magnetic surface 206 using an analog write signal. In some configurations, head 208 may include more than one read element 214 and/or write element 216 and HDD 200 may include multiple heads 208, arms 210, and/or actuators 212. A preamplifier (preamp or preamplifier circuit) 218 controls the read and write signals to the corresponding read and write elements (e.g., read element 214 and write element 216) of each head (e.g., head 208). Preamplifier 218 may be attached to a flex circuit 220 that provides a data and power bus connection to a printed circuit board (not shown) with other drive control circuitry, such as a disk drive controller, through a flex interface connector 222.

The disk drive controller may include a read/write channel configured to receive an analog read signal from read element 214 through preamplifier 218 and flex circuit 220. The channel may convert the analog read signal to a digital read signal and perform iterative data detection and decoding to recover the data previously stored to disk surface 206. In some configurations, the channel may be configured to perform data detection and decoding on a plurality of data sectors corresponding to a data track. For example, the track configuration may include a track skew (angular differences in track start positions) to allow a track read operation to complete based on maximum detection and postprocessing time. The channel may complete the reading and postprocessing of a complete data track before making the completed data track available to the disk drive controller for further processing and/or return to a requesting or host device. The decode and data transfer from the channel to the controller may take several sector times to complete. Effective time for sequential track processing is increased by track skew time.

With more complex encoding and corresponding error correction processing, such as tracks formatted with a plurality of parity sectors at the end of each track for postprocessing, the time between tracks created by track skew may not be sufficient for the increased postprocessing and/or the required track skew to complete such postprocessing may represent a significant negative impact on sequential track processing times.

There is a need for technology that reduces reliance on track skew for postprocessing time.

SUMMARY

Various aspects for data storage devices with overlapping postprocessing of data tracks are described, particularly read channels configured to process multiple tracks at the same time.

One general aspect includes a data storage device. The data storage device includes a storage medium that includes a plurality of data tracks and a channel circuit configured to: receive a read signal for a first data track of the plurality of data tracks, where the first data track includes a first plurality of data sectors; receive the read signal for a second data track of the plurality of data tracks, where the second data track includes a second plurality of data sectors, the second data track is different than the first data track, and the read signal for the second data track is received after the read signal for the first data track; process, during a first track read operation period, the first plurality of data sectors using error correction codes; and process, during a second track read operation period following the first track read operation period, the second plurality of data sectors and a portion of the first plurality of data sectors using the error correction codes.

Implementations may include one or more of the following features. The first data track and the second data track may be sequential data tracks of the plurality of data tracks; the first data track may include a first plurality of parity sectors corresponding to error correction data for the first plurality of sectors; and the second data track may include second plurality of parity sectors corresponding to error correction data for the second plurality of sectors. Processing, during the first track read operation period, the first plurality of data sectors may include processing the first plurality of data sectors at least once for the first data track. Processing, during the second track read operation period, the second plurality of data sectors and a portion of the first plurality of data sectors may include: processing the second plurality of data sectors at least once for the second data track; and selectively postprocessing the portion of the first plurality of data sectors. The channel circuit may be further configured to: determine a failed sectors threshold for postprocessing, where the portion of the first plurality of data sectors failed to be decoded during the first track read operation period; and compare the portion of the first plurality of data sectors to the failed sectors threshold to determine whether to selectively postprocess the portion of the first plurality of data sectors during the second track read operation period. The failed sectors threshold may be a number of failed sectors that do not exceed a parallel processing capability for postprocessing the portions of the first plurality of data sectors during the second track read operation period; and comparing the portion of the first plurality of data sectors may include comparing a number of failed sectors in the portion of the first plurality of data sectors to the failed sectors threshold. The data storage device may further include a servo controller configured to controllably position a read head over the plurality of data tracks on the storage medium. The channel circuit may be further configured to, responsive to the portion of the first plurality of data sectors meeting the failed sectors threshold: cause the servo controller to maintain the read head on the first data track for a next revolution of the storage medium; and continue the first track read operation period for processing the first plurality of data sectors using error correction codes. The channel circuit may be further configured to: determine a time threshold for postprocessing the portion of the first plurality of data sectors; determine an elapsed time from a start of the second track read operation period; and selectively cause, responsive to the elapsed time meeting the time threshold, the servo controller to return the read head to the first data track for a next revolution of the storage medium for a recovery read operation on the first data track. The data storage device may further include a read channel memory configured to store an in-process plurality of data sectors, where the in-process plurality of data sectors includes data sectors from the first plurality of data sectors and the second plurality of data sectors. The channel circuit may be further configured to: determine available memory in the read channel memory; and selectively cause, responsive to determining insufficient memory is available, the servo controller to maintain the read head on the second data track for a next revolution of the storage medium. The plurality of data tracks may be configured as concentric data tracks. The plurality of data tracks may be configured as continuous data tracks having a track length shorter than an integer number of revolutions. The channel circuit may be further configured to selectively cause the servo controller to skew the read head to maintain the read head on a prior data track for a next revolution for additional processing time.

Another general aspect includes a method that includes: receiving a read signal for a first data track of a plurality of data tracks on a storage medium, where the first data track includes a first plurality of data sectors; receiving the read signal for a second data track of the plurality of data tracks, where the second data track includes a second plurality of data sectors, the second data track is different than the first data track, and the read signal for the second data track is received after the read signal for the first data track, during a first track read operation period, the first plurality of data sectors using error correction codes; and processing, during a second track read operation period following the first track read operation period, the second plurality of data sectors and a portion of the first plurality of data sectors using the error correction codes.

Implementations may include one or more of the following features. The first data track and the second data track may be sequential data tracks of the plurality of data tracks; the first data track may include a first plurality of parity sectors corresponding to error correction data for the first plurality of sectors; and the second data track includes second plurality of parity sectors corresponding to error correction data for the second plurality of sectors. Processing, during the first track read operation period, the first plurality of data sectors may include processing the first plurality of data sectors at least once for the first data track. Processing, during the second track read operation period, the second plurality of data sectors and a portion of the first plurality of data sectors may include: processing the second plurality of data sectors at least once for the second data track; and selectively postprocessing the portion of the first plurality of data sectors. The method may include: determining a field sectors threshold for postprocessing, where the portion of the first plurality of data sectors failed to be decoded during the first track read operation period; and comparing the portion of the first plurality of data sectors to the failed sectors threshold to determine whether to selectively postprocess the portion of the first plurality of data sectors during the second track read operation period. The failed sectors threshold may be a number of failed sectors that do not exceed a parallel processing capability for postprocessing the portions of the first plurality of data sectors during the second track read operation period; and comparing the portion of the first plurality of data sectors may include comparing a number of failed sectors in the portion of the first plurality of data sectors to the failed sectors threshold. The method may include: positioning, during the first track read operation period, a read head over first data track to receive the read signal for the first data track; and, responsive to the portion of the first plurality of data sectors meeting the failed sectors threshold, maintaining the read head on the first data track for a next revolution of the storage medium and continuing the first track read operation period for processing the first plurality of data sectors using error correction codes. The method may include: positioning, during the first track read operation period, a read head over first data track to receive the read signal for the first data track; positioning, during the second track read operation, the read head over the second data track to receive the read signal for the second data track; determining a time threshold for postprocessing the portion of the first plurality of data sectors; determining an elapsed time from a start of the second track read operation period; and selectively returning, responsive to the elapsed time meeting the time threshold, the read head to the first data track for a next revolution of the storage medium for a recovery read operation on the first data track. The method may include: positioning, during the first track read operation period, a read head over first data track to receive the read signal for the first data track; positioning, during the second track read operation, the read head over the second data track to receive the read signal for the second data track; storing, in a read channel memory, an in-process plurality of data sectors, where the in-process plurality of data sectors includes data sectors from the first plurality of data sectors and the second plurality of data sectors; determining available memory in the read channel memory; and selectively maintaining, responsive to determining insufficient memory is available, the read head on the second data track for a next revolution of the storage medium. The method may include: positioning, during the first track read operation period, a read head over first data track to receive the read signal for the first data track; positioning, during the second track read operation period, the read head over the second data track to receive the read signal for the second data track, the plurality of data tracks are configured as continuous data tracks having a track length shorter than an integer number of revolutions and the second data track follows the first data track; and selectively skewing the read head to maintain the read head on a prior data track for a next revolution for additional processing time for the second read operation period.

Still another general aspect includes a data storage device. The data storage device includes: a storage medium that includes a plurality of data tracks; means for receiving a read signal for a first data track of a plurality of data tracks on a storage medium, where the first data track includes a first plurality of data sectors; means for receiving the read signal for a second data track of the plurality of data tracks, where the second data track includes a second plurality of data sectors, the second data track is different than the first data track, and the read signal for the second data track is received after the read signal for the first data track; means for processing, during a first track read operation period, the first plurality of data sectors using error correction codes; and means for processing, during a second track read operation period following the first track read operation period, the second plurality of data sectors and a portion of the first plurality of data sectors using the error correction codes.

The present disclosure describes various aspects of innovative technology capable of improving processing times and/or error rates by supporting increased postprocessing time with less interruption of sequential track read operations. The various embodiments include operations and control circuitry to overcome or at least reduce issues previously encountered in data storage devices and, accordingly, are more efficient, reliable, and/or higher performance than other data storage devices. That is, the various embodiments disclosed herein include hardware and/or software with functionality to improve data storage device performance, such as by using overlapping error correction code (ECC) processing for multiple data tracks at the same time. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Prior configurations of error correction code (ECC) processing units in read channel circuits received a data stream composed of the data sectors making up the data track, such as a 4 kilobyte (kB) data unit. The decoding of each sector was evaluated, passed sectors were output from the ECC processing unit and failed sectors were stored in a memory buffer in the read channel. In data track configurations with track ECC parity sectors (additional parity information provided at the end of each track), the failed sectors were then postprocessed using the ECC parity sector data to complete decoding of the failed sectors and output them. For example, each track may include a number of parity sectors following the last data sector of the track (in addition to the one or more levels of parity encoding within each sector). The passed sectors from the initial ECC processing and parity sector postprocessing may be passed to data storage device firmware as a decoded data track.

In a concentric data track configuration, the start of each adjacent track may be skewed from the end of the prior track. The skew may allow for track seek time between adjacent tracks for continuous read or write operations. Additional skew may be configured between tracks to also allow for maximum detection and postprocessing time, above the seek/settle time used by the servo. The decode time from the last read sector of the track, as well as the data transfer from the channel to the controller firmware, may take multiple sector times (and corresponding track skew) to complete. Increased track skew may increase the effective time for sequential track processing, slowing the data storage device's sequential read speed. While prior channels may have been configured for parallel processing of sectors during initial ECC processing and/or postprocessing, each data track is handled sequentially and a new track read operation is not initiated until the read channel has returned the prior track to controller firmware.

The present disclosure uses overlapping processing of multiple tracks to allow postprocessing for one track to be completed during the read operations of later tracks. By enabling overlapping processing, track skew may be reduced to only the skew required for head positioning between tracks. As the read channel receives and processes sectors from the next data track, any postprocessing needed for the prior data track may be executed in parallel using shared memory and processing resources. Novel decision-tree logic may be used to manage head positioning for sequential and recovery read operations, as well as using revolutions to provide additional processing time when memory availability in the channel becomes a constraint. For example, failed sector thresholds and postprocessing time thresholds may be used to initiate recovery read operations.

Figure 1:
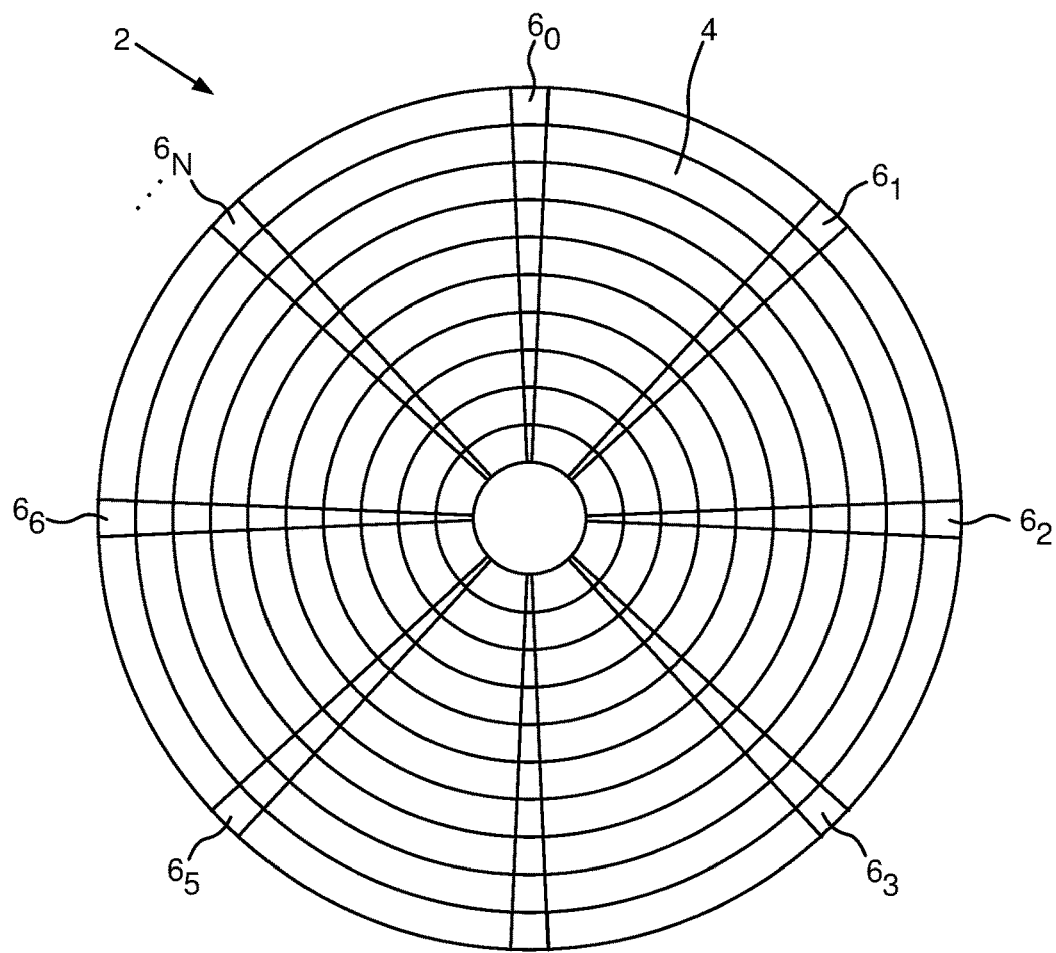
FIG. 1 is a diagram of a prior art disk format comprising a plurality of servo tracks defined by servo sectors.
Figure 2:
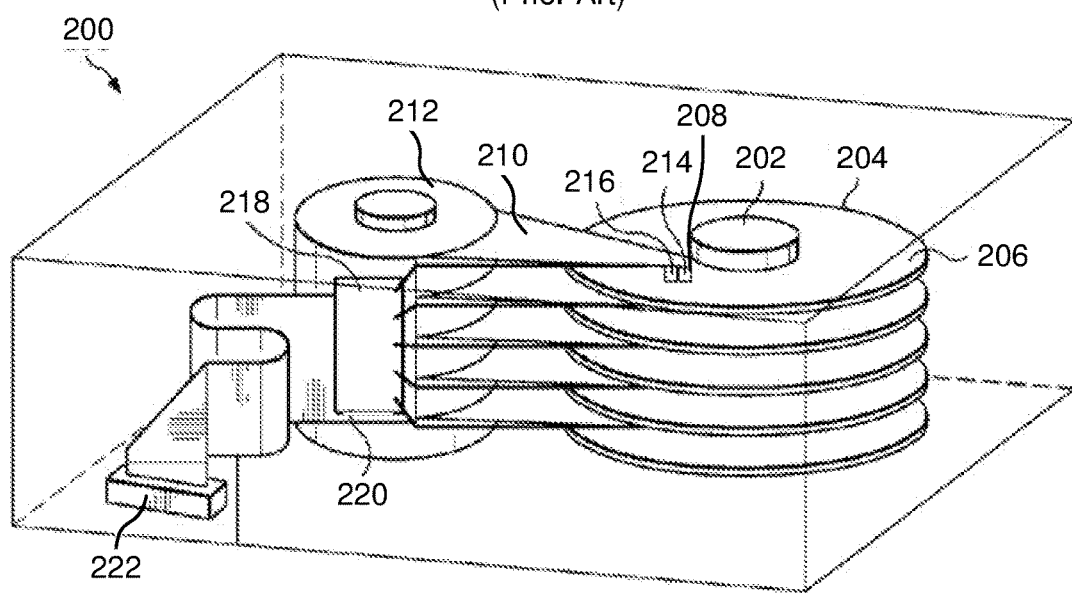
FIG. 2 is a diagram of an example data storage device in the form of a disk drive comprising a heads actuated over disk surfaces.
Figure 3:
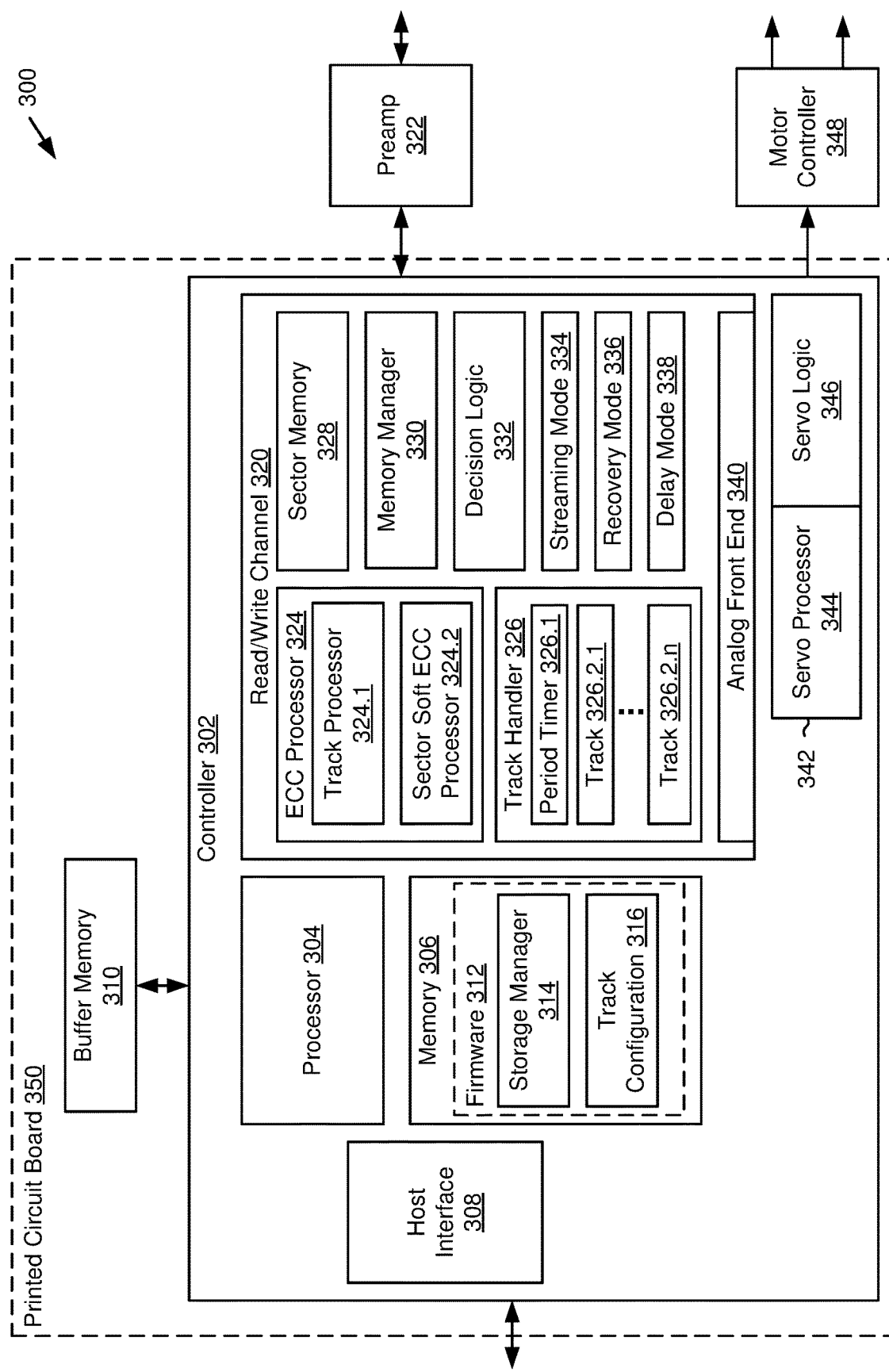
FIG. 3 is a block diagram of a configuration of data storage device electronics for a controller and read/write channel configured for overlapping processing.

FIG. 3 shows a portion of example control circuitry 300 for a data storage device, such as a hard disk drive (HDD). In the example shown, control circuitry 300 may include one or more controllers. Controller 302 may comprise a storage device controller configured to receive host storage commands, process storage operations for writing, reading, and managing data stored to non-volatile storage media in the disk drive, such as the magnetic media disks in FIGS. 1 and 2. In some embodiments, controller 302 may correspond to a separate host interface and read/write path to a subset of disk surfaces in a data storage device with multiple controllers. In some embodiments, controller 302 may be configured to manage servo and read/write operations for one or more actuators, heads, and corresponding writer and reader elements.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, motor controller 348, other controllers, and/or other circuitry components. In some embodiments, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware 312, comprising instructions that include one or more modules or sub-modules for specific data storage device operations and processor 304 may execute those instructions, including controlling communication with other components, such as host interface 308, buffer memory 310, read/write channel 320, and servo controller 342.

Controller firmware 312 may include a storage manager 314 configured to receive host storage commands through host interface 308 and determine storage operations to be executed by controller 302 using read/write channel 320 and servo controller 342. For example, storage manager 314 may process read, write, delete, and similar commands targeting host data to be written to or read from the storage medium of the data storage device. Processing a read operation may include causing servo controller 342 to position the read heads over a desired track on the storage medium, applying a read voltage to the read head through preamp 322, receiving the read data in read/write channel 320, decoding the read data from the read head into decoded bit data returned to storage manager 314 (and/or buffer memory 310).

Controller firmware 312 may include a track configuration 316 based on how the storage medium has been configured for data storage. Track configuration 316 may include a combination of servo formatting (see FIG. 1) and data track formatting. Track configuration 316 may support a defined block size and corresponding number and size of sectors per track. In some embodiments, track configuration 316 may include data track formatting as either concentric tracks, where each track form a distinct ring with a starting and ending point on the same circumference, or continuous tracks, where the tracks form a continuous spiral with start and end positions that are not on the same circumference. Track configuration 316 may be stored in a set of media configuration parameters for the servo and data track formats.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 320 may provide the analog write signal to and receive the analog read signal from preamp 322, which controls and amplifies signals to and from the heads. Binary data for recording to the storage medium may be received by read/write channel 320 from controller firmware 312 and decoded data from read/write channel 320 may be passed to controller firmware 312 and/or directed to buffer memory 310 for communication to the host. In some embodiments, read/write channel 320 may include an analog front end 340 configured to receive the analog read signal from preamp 322 and convert it into a digital read signal for processing by other components of read/write channel 320. For example, analog front end 340 may include an analog-digital converter (ADC), timing circuit, and one or more filters, equalizers, and/or other signal conditioning components for generating the digital read data.

In some configurations, read write channel 320 may include an ECC processor 324 configured to receive read data for a data track from the read heads and use iterative ECC processing to decode the received read data into decoded data for further processing by controller firmware 312 and/or communication to the host. For example, ECC processor 324 may include one or more soft output Viterbi algorithm (SOVA) detectors and low density parity check (LDPC) decoders operating on multi-bit encoded symbols to decode each sector of data received by read/write channel 320. In some configurations, ECC processor 324 may include distinct processing components, such as a track processor 324.1 and a sector soft ECC processor 324.2. For example, track processor 324.1 may be configured to process each data sector in a data track (sequentially or using some level of parallelism) using the parity data encoded with the user data within each sector. Sector soft ECC processor 324.2 may be configured to process sectors that failed to be correctly decoded by track processor 324.1 using parity sector data stored at the end of the data track. In some configurations, track processor 324.1 may sequentially process each data sector in the data track during an initial processing phase to decode the data block in the track and sectors that are not successfully decoded by track processor 324.1 may be selectively stored to sector memory 328 for postprocessing by sector soft ECC processor 324.2. Processing by sector soft ECC processor 324.2 may necessarily follow the complete read of the track and parity sector ECC data so that the parity sector data may be used by sector soft ECC processor 324.2 to postprocess the failed sectors. Separately managing and resourcing track processor 324.1 and sector soft ECC processor 324.2 may enable overlapping sequential processing and postprocessing with relatively small additional memory and/or processing power.

Read/write channel 320 may include a track handler 326 configured to manage data and processing/postprocessing status for multiple tracks being processed at the same time. For example, read/write channel 320 may be configured for parallel processing of multiple sequential data tracks that allows ECC processor 324 to continue to working on decoding a prior track after it has started a next (or even later subsequent) track(s) and corresponding next revolution of the storage medium. Read/write channel 320 may have a parallel processing capability defined by the hardware and/or firmware configuration of read/write channel 320. For example, the parallel processing capability may be based on a limiting operating factor, such as a number of in-process sectors that may be held in sector memory 328, buffering and/or processing capacity of ECC processor 324, and/or a maximum number of tracks managed by track handler 326. In some configurations, read/write channel 320 may use a failed sectors threshold based on a number of failed sectors that do not exceed a parallel processing capability for postprocessing in-process data sectors from prior tracks during the read operation period of a current or next data track. Track handler 326 may include a period timer 326.1 configured to track an elapsed time for each track read operation. For example, period timer 326.1 may determine a start time for each track read operation from either the start of the track read (when read data for the first sector of the track is received by read/write channel 320). In some configurations, period timer 326.1 may also (or alternatively) measure the elapsed postprocessing time for each track from the track end, a completion time of sector processing by track processor 324.1, and/or the start of the next track. Each track read operation may have a track read operation period from the start of the track read to the completion of track processing and return of the decoded data to controller firmware 312. Each track read operation period may include a track reading period (when the head is on the track and sending read data for the track to read/write channel 320), an initial track processor period (when all sectors are initially being processed by track processor 324.1—this may overlap substantially with the track reading period), and a postprocessing period (when failed sectors are selectively postprocessed by sector soft ECC processor 324.2).

Track handler 326 may include a data structure for storing track identifiers and ECC processing information for a plurality of data tracks 326.2.1-326.2.$n$ that are being processed by read/write channel 320 during overlapping track read operation periods. For example, at a given time, sector data for one or more failed sectors from track 326.2.1 may be stored in sector memory 328 for processing by sector soft ECC processor 324.2 while sector data for track 326.2.$n$ (the current track in its track reading period) may be streamed through track processor 324.1 for the initial track processing of each data sector. In some configurations, track handler 326 may maintain track identifiers, timers, and/or memory allocations for any number of tracks with overlapping processing. For example, in a series of sequential track read operations, failed sectors for track 326.2.1 may be joined by failed sectors from the next sequential tracks n−1, n−2, etc. as in-process sectors in sector memory 328 and the respective overlapping track read operation periods may end as all sectors are completed for each, which may occur out of their track or read order. In some configurations, soft sector ECC processor 324.2 may include a processing queue comprised of all failed sectors from prior track reads that are eligible for processing by sector soft ECC processor 324.2, such as in a first-in-first-out (FIFO) order. Period timer 326.1 and decision logic 332 may, as further described below, determine when a postprocessing time expires and failed sectors that have not yet been successfully processed by sector soft ECC processor 324.2 may be removed from the queue, such as when a recovery read is being triggered for that data track.

Read/write channel 320 may include a sector memory 328 and a memory manager 330. Sector memory 328 may be a physical memory buffer and/or allocation within a physical data structure for receiving sector data for failed data sectors. For example, sector memory 328 may be a set of memory registers corresponding to an integer number of sector sizes and/or a portion of a read channel memory in read/write channel 320 shared with other read/write channel components or processes. Data sectors that have been read but not yet fully decoded and released by channel 320 may be referred to as in-process sectors and sector memory 328 may be configured to store in-process sectors. In some configurations, sector memory 328 may receive only in-process data sectors that failed to be decoded by track processor 324.1 and are awaiting postprocessing by sector soft ECC processor 324.2. Memory manager 330 may include logic for allocating sector memory 328 to failed sectors for a plurality of data tracks with overlapping processing. For example, memory manager 330 may assign sector-sized memory locations to each failed sector generated by track processor 324.1, store or hold the failed sector data in sector memory 328 for postprocessing by sector soft ECC processor 324.2, and release memory locations for use by another failed sector once postprocessing is complete (or times out for that data track). In some configurations, sector memory 328 may also store corresponding parity sector data for data tracks with failed sectors in postprocessing. Memory manager 330 may track the total memory allocated and available in sector memory 328. For example, memory manager 330 may determine an amount of available memory in terms of bits, bytes, or sectors, and generate an insufficient memory indicator when the amount of available memory falls below an available memory threshold, such as one or more sectors. In some configurations, available memory and/or insufficient memory indicators may be used by decision logic 332.

Read/write channel 320 may include decision logic 332 that may be configured to control various read operating modes that may influence both read/write channel 320 and servo controller 342. For example, decision logic 332 may determine an operating mode of the data storage device during read operations, such as sequential track read operations. In some configurations, decision logic 332 may support a streaming mode 334, a recovery mode 336, and a delay mode 338. For example, streaming mode 334 may be a default mode for sequential read operations where each sequential track is read, the read data for each sector is streamed to read/write channel 320, and, between initial processing by track processor 324.1 and overlapping postprocessing by sector soft ECC processor 324.2, read/write channel 320 sequentially returns the decoded data for each track read without initiating one of the other modes. Recovery mode 336 may be triggered when sector soft ECC processor 324.2 cannot recover one or more failed sectors after a given time period or number of tries and/or other resource constraints trigger a reread of a previously read track. In some configurations, recovery mode 336 may include heroic recovery modes that follow a different read process than streaming mode 334. Delay mode 338 may be triggered when a processing resource, such as sector memory 328, no longer has capacity to meet the overlapping processing and postprocessing without additional time. For example, delay mode 338 may use an extra revolution, without regard for reading data, to enable ECC processor 324, memory manager 330, and/or decision logic 332 to free the need resources to continue in streaming mode 334 (or trigger recovery mode 336). Specific examples of decision logic that may be implemented by decision logic 332 as hardware, software, and/or a combination thereof are further described below. Decision logic 332 and the various modes may operate in conjunction with storage manager 314, servo controller 342, and/or other components of read/write channel 320, such as ECC processor 324, track handler 326, and memory manager 330.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. In some embodiments, servo controller 342 may include servo processor 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo signals read from the disk surface using preamp 322 and provided to servo controller 342. Servo controller 342 may provide servo control signals to motor controller 348 and motor controller 348 may control one or more actuator VCMs and/or a spindle motor for rotating the disk stack.

Figure 4A:
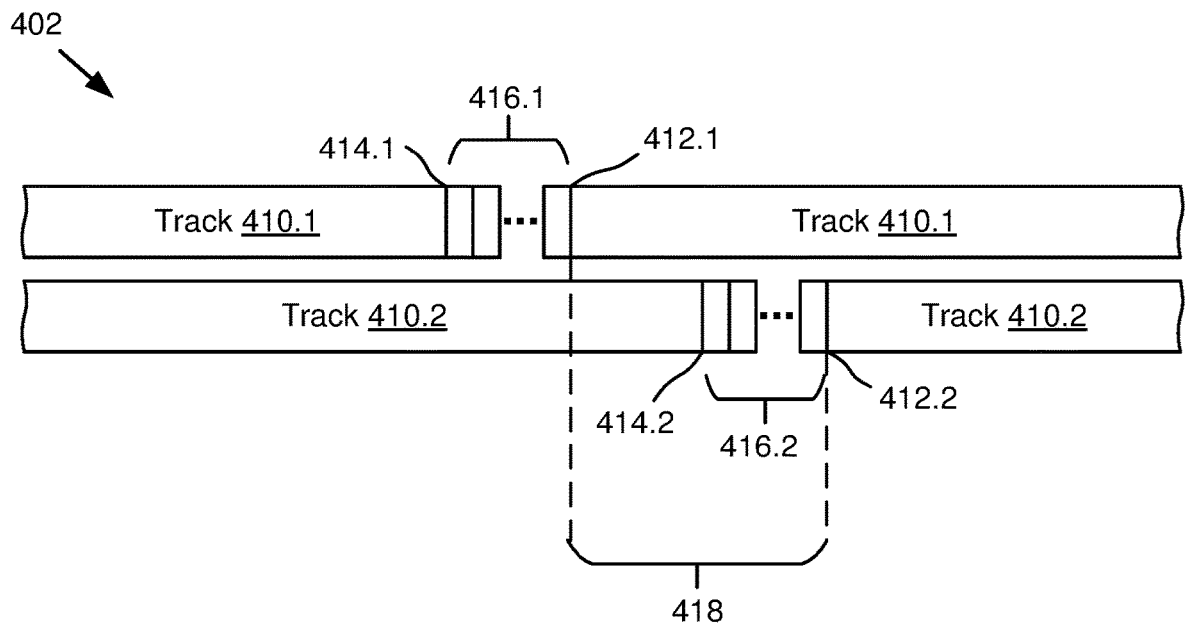
FIGS. 4A and 4B are diagrams of example data track configurations supported by overlapping processing.
Figure 4B:
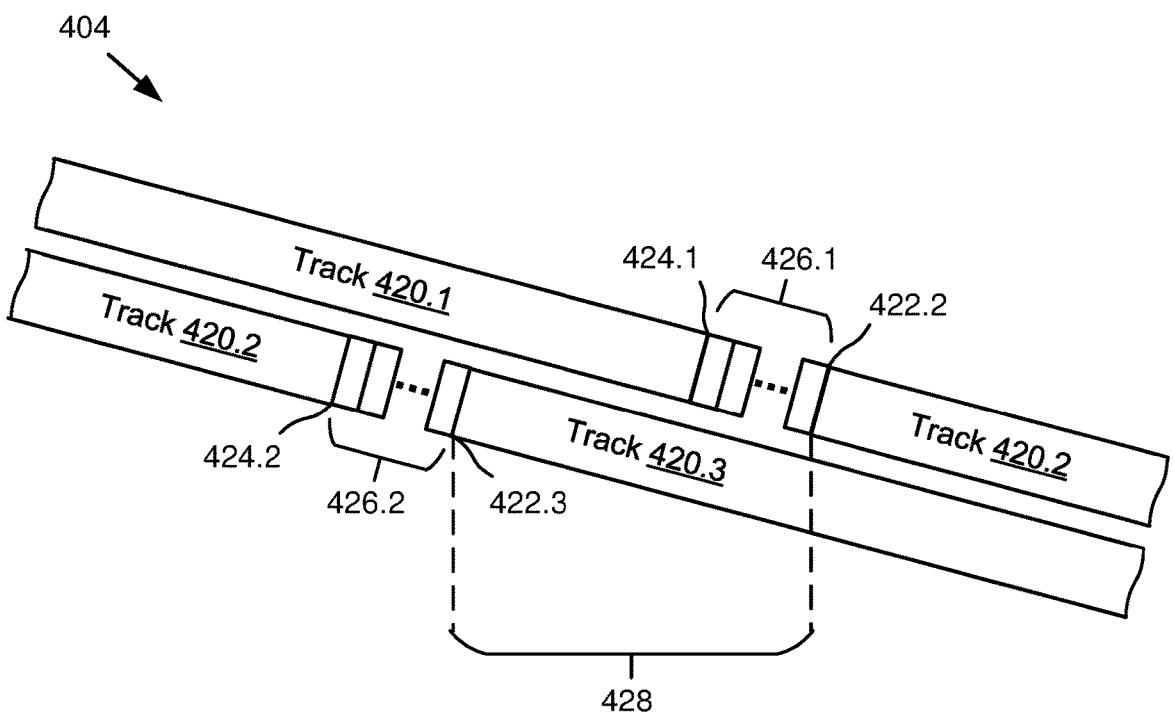
Figure 5:
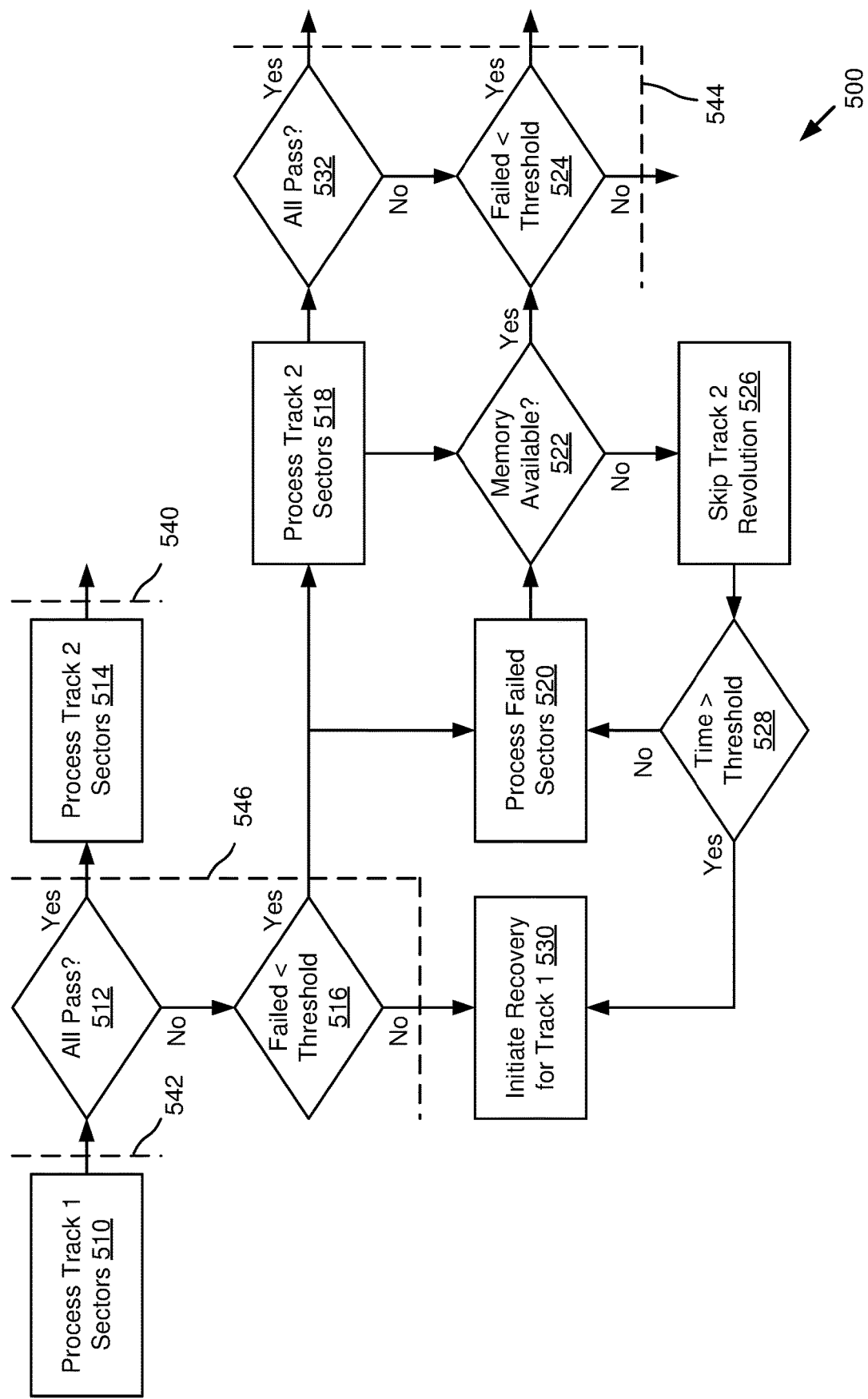
FIG. 5 is an example method of executing overlapping processing for concentric data tracks.
Figure 6:
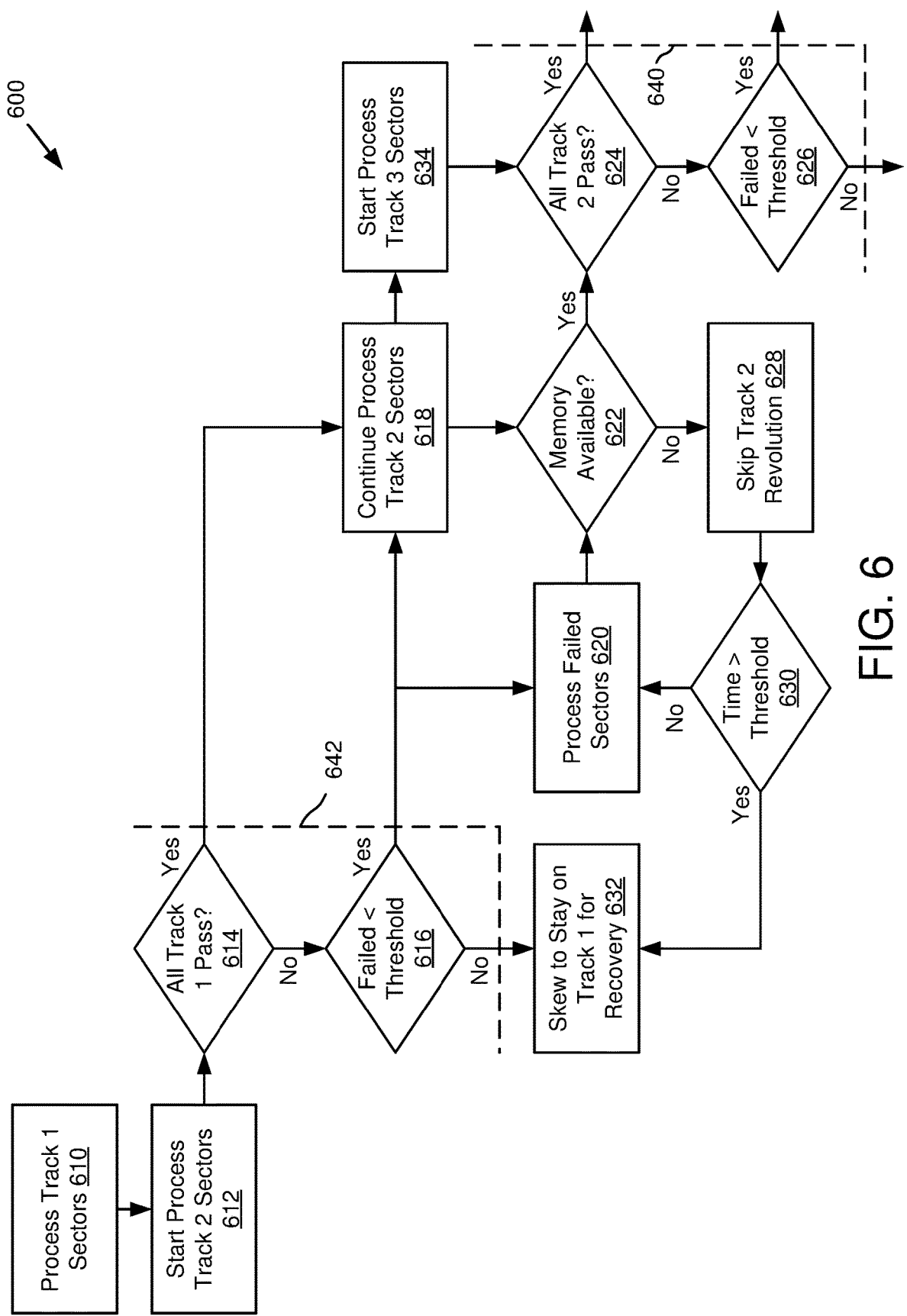
FIG. 6 is an example method of executing overlapping processing for spiral data tracks.
Figure 7:
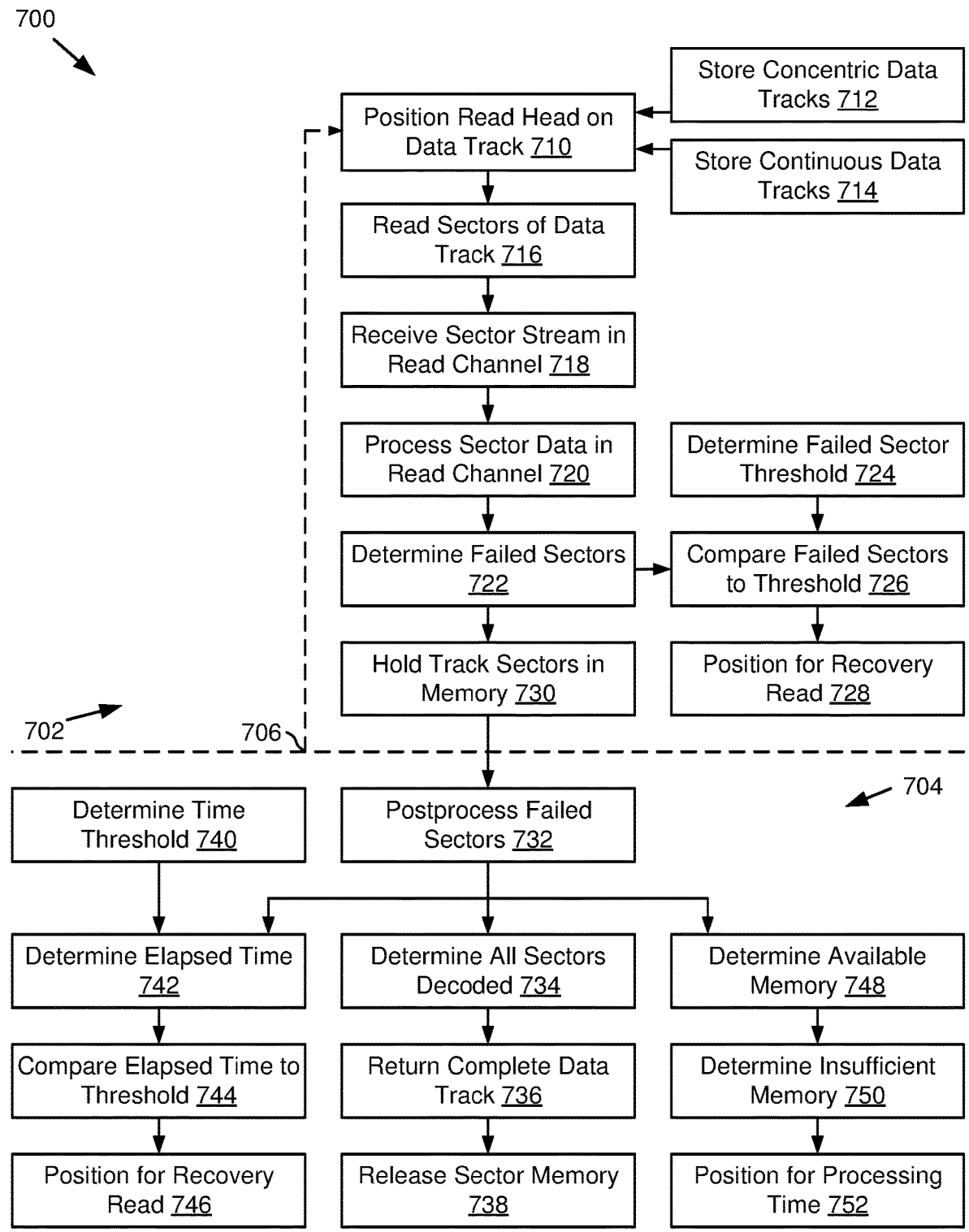
FIG. 7 is an example method of processing a data track over multiple track read operation periods.

FIGS. 4A and 4B show different track configurations that may be used in conjunction with control circuitry 300 in FIG. 3 and/or the methods 500, 600, and 700 of FIGS. 5-7. More specifically, FIG. 4A shows a concentric track configuration 402 and FIG. 4B shows a continuous or spiral track configuration 404.

FIG. 4A shows adjacent tracks 410.1 and 410.2. Each track 410 forms a concentric ring at a determined circumference. The curvature is not reflected due to the large difference between track width and circumference and only the segment near the start and end of each track is shown (not the entire track). Track 410.1 has a track start 412.1 and a track end 414.1 and traverses a plurality of sectors in between. The data sectors would include a first data sector proximate track start 412.1 and a last data sector proximate track end 414.1. Track 410.1 also includes a set of parity sectors 416.1 including additional ECC parity data for the data sectors in track 410.1. Track 410.2 is configured similarly to track 410.1, including a track start 412.2, a track end 414.2, and a set of parity sectors 416.2. Note that track start 412.1 is offset from track start 412.2 by a track offset or skew 418 to allow for repositioning the head between tracks for a sequential read.

In some configurations, track skew 418 may be determined to be just large enough to allow for head repositioning from track to track, not for providing postprocessing time. The sequential read of track 410.2 may start while the postprocessing of track 410.1 continues until finished (which could extend across additional track reads beyond those shown). Because of the overlapping processing, sequential track processing doesn't increase the per track processing time (as long as memory and processor resources are adequate to keep up with error rates).

FIG. 4B shows adjacent tracks 420.1, 420.2, and 420.3. Each track 420 forms part of a continuous spiral from an outer circumference toward an inner circumference. The curvature is not reflected due to the large difference between track width and circumference, and only the segment near the start and end of each track is shown (not the entire track). Also, the angle of the spiral is exaggerated for illustration purposes. Track 420.2 has a track start 422.2 and a track end 424.2 and traverses a plurality of sectors in between. The data sectors would include a first data sector proximate track start 422.2 and a last data sector proximate track end 424.2. Track 420.2 also includes a set of parity sectors 426.2 including additional ECC parity data for the data sectors in track 420.2. Track 420.1 is configured similarly to track 420.2, including a track start (not shown), a track end 424.1, and a set of parity sectors 426.1. Track 420.3 would also be similar, having a track start 422.3 and a track end and set of parity sectors that are not shown. There is no track skew for continuous tracks, since the end of one track is the start of the next track without any need to reposition the head. However, track ends may not align and track may be configured with non-integer revolution lengths.

In some configurations, a return skew 428 may be considered for supporting reread or recovery operations. For example, if a reread or recovery is triggered for track 420.2 at the end of track 420.2, return skew 428 provides the servo controller with time to reposition the head back to track start 422.2 without having to wait for a complete revolution. Return track skew 428 may be implemented by using track lengths that are slightly shorter than integer numbers of track revolution and may allow reread head positioning without extra time loss. When no reread is needed, the sequential read of track 420.2 may start while the postprocessing of track 420.1 continues until finished (which could extend across the sequential read of track 420.3). Because of the overlapping processing, sequential track processing may enable continuous sequential read of the spiral track as long as memory and processing capabilities can keep up with the overlapping ECC processing demands.

As shown in FIG. 5, control circuitry 300 may be operated with a concentric data format, such as concentric track configuration 402 in FIG. 4A, according to an example method of executing overlapping processing for concentric data tracks in a data storage device, i.e., according to the method 500 illustrated by blocks 510-532. In some configurations, blocks 510-532 may be implemented in decision logic within a read channel circuit.

At block 510, a first track's sectors may be processed. For example, the read signal for a track read may be directed to a track ECC processor for ECC processing of each sector based on the parity data within that sector.

At block 512, whether the sectors have all passed may be evaluated. For example, the decision logic may determine whether any sectors have not been decoded based on their internal ECC. If all sectors have passed, then method 500 may continue to block 514, without any need of postprocessing. If all sectors have not passed, then method 500 may continue to block 516.

At block 514, a next track's sectors may be processed. For example, the track skew may allow the servo controller to reposition the head for the next adjacent track and the read signal may be processed as described for block 510. Method 500 may return from line 540 to line 542, treating the next track as the first track.

At block 516, whether the failed sectors meet a failed sector threshold may be determined. For example, the decision logic may compare the number of failed sectors to a failed sector threshold for triggering a reread operation where correction of all failed sectors in postprocessing is unlikely and/or requires too many postprocessing resources (memory or ECC processing capacity). If the number of failed sectors is below the threshold, method 500 may proceed to block 518. If the number of failed sectors meets the threshold, method 500 may proceed to block 530.

At block 518, the next track's sectors may be processed while the failed sectors are processed at block 520. For example, the track ECC processor may process the next track's sectors as they are read and the sector soft ECC processor may process the failed sectors from read channel memory.

At block 522, whether memory is available may be evaluated. For example, the decision logic may use an available memory or insufficient memory indicator from a memory manager to determine whether sufficient memory is available to continue overlapping processing. If memory is available, method 500 may proceed to block 524. If insufficient memory is available, method 500 may proceed to block 526.

At block 524, whether the failed sectors meet a failed sector threshold may be determined. For example, the decision logic may compare the number of failed sectors to a failed sector threshold, but the number of failed sectors may include both remaining failed sectors from the first track and additional failed sectors for the next track if all sectors did not pass at block 532. If the number of failed sectors is below the threshold, method 500 may continue by proceeding to the next track, where line 544 represents a return to line 546 for still another track in the sequence. If the number of failed sectors meets the threshold, method 500 may initiate a read recovery, as described for block 530.

At block 526, a read revolution may be skipped for additional processing time. For example, the decision logic may suspend read operation for a revolution to provide additional time for postprocessing failed sectors, completing decoding of earlier sectors/tracks and getting those failed sectors out of read channel memory to make memory available for additional tracks (and corresponding failed sectors).

At block 528, an elapsed time may be compared to a time threshold. For example, the decision logic may compare an elapsed postprocessing time for one or more failed sectors, such as the failed sectors associated with a prior track, and determine whether the elapsed time has met a time threshold for triggering a recovery operation. If the time threshold is not met, method 500 may return to block 520 to continue processing failed sectors. If the time threshold is met, method 500 may proceed to block 530 and initiate a recovery read operation.

At block 530, a recovery read operation may be initiated for the first track (or another earlier track). For example, the decision logic may initiate a recovery mode targeting the first track based on the number of failed sectors in that track (and the ability to reread by staying on the track) or based on a postprocessing time limit being reach (and the need to reread to attempt to recover the failed sectors that have not been resolved through postprocessing).

Block 532 may be the same evaluation of passed sectors as block 512, but for the next track. If all sectors pass, method 500 may proceed to the next track, where line 544 represents a return to line 546 for still another track in the sequence. If there are failed sectors, method 500 proceeds to block 524.

As shown in FIG. 6, control circuitry 300 may be operated with a continuous data format, such as spiral track configuration 404 in FIG. 4B, according to an example method of executing overlapping processing for continuous data tracks in a data storage device, i.e., according to the method 600 illustrated by blocks 610-634. In some configurations, blocks 610-634 may be implemented in decision logic within a read channel circuit.

At block 610, a first track's sectors may be processed. For example, the read signal for a track read may be directed to a track ECC processor for ECC processing of each sector based on the parity data within that sector.

At block 612, processing of a next track's sectors may be started. For example, because the start of the next track is continuous with the end of the first track, the read signal for the next track read may be directed to a track ECC processor for ECC processing while the decision logic evaluates the initial processing and postprocessing of the first track.

At block 614, whether the sectors have all passed may be evaluated. For example, the decision logic may determine whether any sectors have not been decoded based on their internal ECC. If all sectors have passed, then method 600 may continue to block 618, without any need of postprocessing. If all sectors have not passed, then method 600 may continue to block 616.

At block 616, whether the failed sectors meet a failed sector threshold may be determined. For example, the decision logic may compare the number of failed sectors to a failed sector threshold for triggering a reread operation where correction of all failed sectors in postprocessing is unlikely and/or requires too many postprocessing resources (memory or ECC processing capacity). If the number of failed sectors is below the threshold, method 600 may proceed to block 618. If the number of failed sectors meets the threshold, method 600 may proceed to block 632.

At block 618, the next track's sectors may continue to be processed while the failed sectors are processed at block 620. For example, the track ECC processor may continue to process the next track's sectors as they are read and the sector soft ECC processor may process the failed sectors from read channel memory.

At block 622, whether memory is available may be evaluated. For example, the decision logic may use an available memory or insufficient memory indicator from a memory manager to determine whether sufficient memory is available to continue overlapping processing. If memory is available, method 600 may proceed to block 624. If insufficient memory is available, method 600 may proceed to block 628.

At block 626, whether the failed sectors meet a failed sector threshold may be determined. For example, the decision logic may compare the number of failed sectors to a failed sector threshold, but the number of failed sectors may include both remaining failed sectors from the first track and additional failed sectors for the next track if all sectors did not pass at block 624. If the number of failed sectors is below the threshold, method 600 may continue by proceeding with the next track started at block 634 (as soon as the prior track read completed), where line 640 represents a return to line 642 for still another track in the sequence. If the number of failed sectors meets the threshold, method 600 may initiate a read recovery, as described for block 632.

At block 628, a read revolution may be skipped for additional processing time. For example, the decision logic may suspend read operation for a revolution while skewing the head back to the start of the prior track to provide additional time for postprocessing failed sectors, completing decoding of earlier sectors/tracks and getting those failed sectors out of read channel memory to make memory available for additional tracks (and corresponding failed sectors).

At block 630, an elapsed time may be compared to a time threshold. For example, the decision logic may compare an elapsed postprocessing time for one or more failed sectors, such as the failed sectors associated with a prior track, and determine whether the elapsed time has met a time threshold for triggering a recovery operation. If the time threshold is not met, method 600 may return to block 620 to continue processing failed sectors. If the time threshold is met, method 600 may proceed to block 632 and initiate a recovery read operation.

At block 632, a recovery read operation may be initiated for the first track (or another earlier track). For example, the decision logic may initiate a recovery mode targeting the first track based on the number of failed sectors in that track or based on a postprocessing time limit being reach (and the need to reread to attempt to recover the failed sectors that have not been resolved through postprocessing). In either case, the servo controller will skew the read head back to the start of the prior track to be recovered.

As shown in FIG. 7, control circuitry 300 may be operated according to an example method of processing a data track over multiple track read operation periods in a data storage device, i.e., according to the method 700 illustrated by blocks 710-752. For example, blocks 710-730 (except for block 712-714) may be executed during a first track read operation period 702, while the read head is reading data from the first track, and blocks 732-752 may be executed during a second track read operation period 704, while the read head is reading data for the next track and causing overlapping processing of the adjacent tracks in a sequential read. In a data storage device with a continuous data format, some or all of blocks 724-728 may be processed during the next track read operation due to the continuous nature of the data tracks.

At block 710, a head may be positioned on a data track. For example, a servo controller may position the read head for reading data from a first track on the data storage medium of a data storage device.

At block 712, the data may have been stored as concentric data tracks. For example, the data storage device may be formatted with concentric data tracks storing host data for sequential reads in adjacent concentric tracks. Alternatively, at block 714, the data may have been stored as continuous data tracks. For example, the data storage device may be formatted with continuous data tracks storing host data for sequential reads along the spiral read path.

At block 716, the data sectors of the data track may be read. For example, the read head may generate an analog read signal and direct it through the preamp to the read channel circuit.

At block 718, the sector read data stream may be received in the read channel. For example, the read channel may receive the analog read signal through an analog front end, convert the analog read signal to a digital read signal, and direct the digital read signal to the ECC processor in the read channel.

At block 720, sector read data for each data sector may be processed in the read channel. For example, a track ECC processor may process each data sector as it is received using the parity data within the sector read data.

At block 722, failed sectors may be determined. For example, the track ECC processor may return success or failure for each sector after initial processing of that sector.

At block 724, a failed sectors threshold may be determined. For example, the decision logic may be configured with a failed sector threshold for determining whether to initiate a recovery read.

At block 726, the failed sectors may be compared to the failed sector threshold. For example, the decision logic may compare the number of failed sectors to the failed sector threshold. If the threshold is met, the decision logic may proceed to block 728 to initiate the servo controller to position the read head for a read recovery and initiate the read channel circuit to perform a read recovery operation on the first track. For example, in a concentric data format, the servo controller may maintain the read head position for another revolution on the same track and, in a continuous data format, the servo controller may skew the read head to return to the start of the track.

At block 730, each failed sector may be stored or held in read channel memory for postprocessing. For example, a memory manager may store the failed sector data and/or corresponding sector parity data to sector memory in the read channel memory.

Line 706 may denote postprocessing and related decision logic that overlaps the processing of a next data track by returning to block 710. Thus, the postprocessing period of the first data track read operation period may overlap the track read and initial sector processing period of the next data track read operation period.

At block 732, failed data sectors may be postprocessed. For example, a sector soft ECC process may selectively process the failed data sectors to attempt to decode them using sector parity data. Decision logic may monitor several operating conditions at blocks 734, 742, and 748 to manage postprocessing of the failed data sectors At block 734, whether all failed sectors have been decoded may be determined. For example, the decision logic may track the completion of all data sectors, including those completed in postprocessing.

At block 736, a complete data track may be returned. For example, the read channel may return the decoded data for a complete data track responsive to determining that all sectors have been decoded.

At block 738, sector memory in the read channel memory may be released. For example, the memory manager may release the sector memory that was previously used for failed sectors and/or buffered sectors of the complete data track.

At block 740, a time threshold may be determined. For example, the decision logic may be configured with a time threshold for timing out the postprocessing for the failed sectors of one or more data tracks.

At block 742, an elapsed time may be determined. For example, the read channel may track the elapsed time for postprocessing each failed sector and/or data track.

At block 744, the elapsed time may be compared to the time threshold. For example, the decision logic may compare the elapsed time counters for each failed sector or data track in postprocessing to determine when the threshold is met.

At block 746, if the time threshold is met, the read head may be positioned for a recovery read. For example, the decision logic may initiate the servo controller to position the read head for a read recovery operation and initiate the read channel circuit to perform a read recovery operation on the first track. For example, in a concentric data format, the servo controller may return the read head to the first track for another revolution and, in a continuous data format, the servo controller may skew the read head to return to a prior track.

At block 748, available memory may be determined. For example, the memory manager may track the sector memory available in the read channel memory.

At block 750, insufficient memory may be determined. For example, the memory manager may indicate insufficient memory to the decision logic.

At block 752, if memory is insufficient, the read head may be positioned for a delay revolution. For example, the data storage device may complete a revolution without regard for the read data, such as by not generating a read signal or not processing the read signal within the read channel, to allow the read channel to catch up on postprocessing and free additional memory for a next track read operation. In a concentric data format, the read head may be maintained on the current data track for an extra revolution. In a continuous data track, the read head would be skewed back to a prior track before or after the extra revolution.

Figure 8:
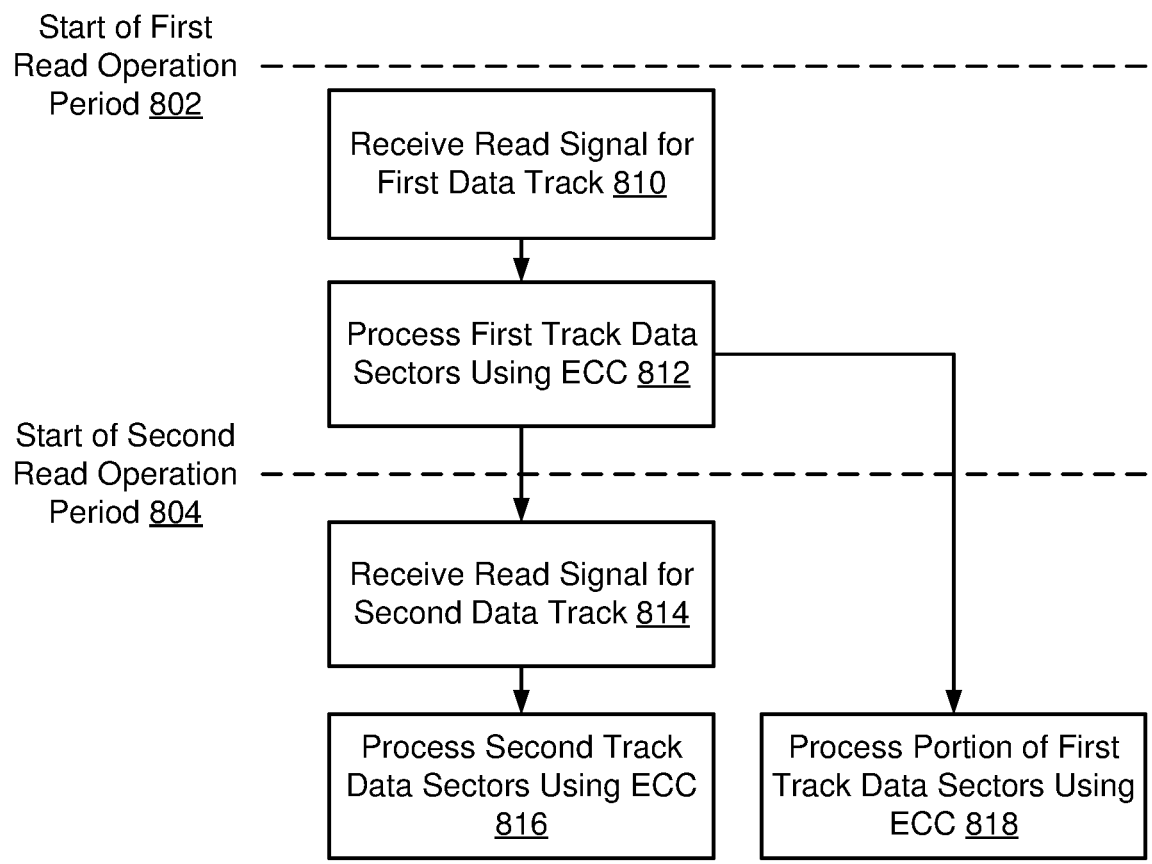
FIG. 8 is an example method of processing multiple data tracks during a read operation period.

As shown in FIG. 8, control circuitry 300 may be operated according to an example method of processing multiple data tracks during a read operation period in a data storage device, i.e., according to the method 800 illustrated by blocks 810-818. For example, at 802, a first read operation period may start when read signal data corresponding to the data sectors in a first track are sensed from the disk and received by the read channel. At 804, a second read operation period may start when read signal data corresponding to the data sectors of the second track are sensed from the disk and received by the read channel. A portion of the data sectors from the first track, such as data sectors that failed during a first pass of ECC processing, may continue to be processed even after the start of the second read operation period and in parallel with processing the data sectors from the second track.

At block 810, the read signal for a first data track may be received. For example, a read head following the data track may stream data corresponding to each sequential sector in the track, including any parity sectors, to the read channel.

At block 812, the data sectors for the first track may be processed using ECC. For example, each sector may be sequentially processed according to ECC embedded within the data sectors in a first pass through a sequential track processor in the ECC processor.

At block 814, the read signal for a second data track may be received. For example, the read head following the next data track in a sequential read configuration may stream data corresponding to each sequential sector in the next track, including any parity sectors, to the read channel.

At block 816, the data sectors for the second track may be processed using ECC. For example, each sector in the second track may be sequentially processed according to ECC embedded within the data sectors during a first pass through the sequential track processor in the ECC processor.

At block 818, a portion of the first track data sectors may be processed using ECC during the second read operation period. For example, in parallel with processing the second track data sectors at block 816, selected data sectors from the first track may be processed using a sector soft ECC processor in the ECC processor.

Technology for improved sequential read data rates for data storage devices using overlapping processing of ECC for multiple tracks is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:
a storage medium comprising a plurality of data tracks; and
a channel circuit configured to:
receive a read signal for a first data track of the plurality of data tracks, wherein the first data track includes a first plurality of data sectors and error correction data for the first plurality of data sectors;
receive a read signal for a second data track of the plurality of data tracks, wherein:
the second data track includes a second plurality of data sectors and error correction data for the second plurality of data sectors;
the second data track is different than the first data track; and
the read signal for the second data track is received after the read signal for the first data track;
process, during a first track read operation period and using error correction codes, the first plurality of data sectors and the error correction data for the first plurality of data sectors to attempt to decode the first plurality of data sectors; and
process, during a second track read operation period following the first track read operation period and using error correction codes:
the second plurality of data sectors and the error correction data for the second plurality of data sectors to attempt to decode the second plurality of data sectors; and a portion of the first plurality of data sectors and the error correction data read during the first track read operation for the first plurality of data sectors to continue to attempt to decode the first plurality of data sectors.

2. The data storage device of claim 1, wherein:
the first data track and the second data track are sequential data tracks of the plurality of data tracks;
the first data track includes a first plurality of parity sectors comprising at least a portion of the error correction data for the first plurality of data sectors; and
the second data track includes a second plurality of parity sectors comprising at least a portion of the error correction data for the second plurality of data sectors.

3. The data storage device of claim 1, wherein:
processing, during the first track read operation period, the first plurality of data sectors and the error correction data for the first plurality of data sectors includes processing the first plurality of data sectors at least once for the first data track;
processing, during the second track read operation period, the second plurality of data sectors and the error correction data for the second plurality of data sectors includes processing the second plurality of data sectors at least once for the second data track; and
processing, during the second track read operations period, the portion of the first plurality of data sectors and the error correction data read during the first track read operation for the first plurality of data sectors includes selectively postprocessing the portion of the first plurality of data sectors.

4. The data storage device of claim 3, wherein the channel circuit is further configured to:
determine a failed sectors threshold for postprocessing, wherein the portion of the first plurality of data sectors failed to be decoded during the first track read operation period; and
compare the portion of the first plurality of data sectors to the failed sectors threshold to determine whether to selectively postprocess the portion of the first plurality of data sectors during the second track read operation period.

5. The data storage device of claim 4, wherein:
the failed sectors threshold is a number of failed sectors that do not exceed a parallel processing capability for postprocessing the portions of the first plurality of data sectors during the second track read operation period; and
comparing the portion of the first plurality of data sectors includes comparing a number of failed sectors in the portion of the first plurality of data sectors to the failed sectors threshold.

6. The data storage device of claim 4, further comprising:
a servo controller configured to controllably position a read head over the plurality of data tracks on the storage medium, wherein the channel circuit is further configured to, responsive to the portion of the first plurality of data sectors meeting the failed sectors threshold:
cause the servo controller to maintain the read head on the first data track for a next revolution of the storage medium; and
continue the first track read operation period for processing the first plurality of data sectors using error correction codes.

7. The data storage device of claim 4, further comprising:
a servo controller configured to controllably position a read head over the plurality of data tracks on the storage medium, wherein the channel circuit is further configured to:
determine a time threshold for postprocessing the portion of the first plurality of data sectors;
determine an elapsed time from a start of the second track read operation period; and
selectively cause, responsive to the elapsed time meeting the time threshold, the servo controller to return the read head to the first data track for a next revolution of the storage medium for a recovery read operation on the first data track.

8. The data storage device of claim 4, further comprising:
a read channel memory configured to store an in-process plurality of data sectors, wherein the in-process plurality of data sectors includes data sectors from the first plurality of data sectors and the second plurality of data sectors; and
a servo controller configured to controllably position a read head over the plurality of data tracks on the storage medium, wherein the channel circuit is further configured to:
determine available memory in the read channel memory; and
selectively cause, responsive to determining insufficient memory is available, the servo controller to maintain the read head on the second data track for a next revolution of the storage medium.

9. The data storage device of claim 1, wherein the plurality of data tracks is configured as concentric data tracks.

10. The data storage device of claim 1, further comprising:
a servo controller configured to controllably position a read head over the plurality of data tracks on the storage medium, wherein:
the plurality of data tracks is configured as continuous data tracks having a track length shorter than an integer number of revolutions; and
the channel circuit is further configured to selectively cause the servo controller to skew the read head to maintain the read head on a prior data track for a next revolution for additional processing time.

11. A method comprising:
receiving a read signal for a first data track of a plurality of data tracks on a storage medium, wherein the first data track includes a first plurality of data sectors and error correction data for the first plurality of data sectors;
receiving a read signal for a second data track of the plurality of data tracks, wherein:
the second data track includes a second plurality of data sectors and error correction data for the second plurality of data sectors;
the second data track is different than the first data track; and
the read signal for the second data track is received after the read signal for the first data track;
processing, during a first track read operation period and using error correction codes, the first plurality of data sectors and the error correction data for the first plurality of data sectors to attempt to decode the first plurality of data sectors; and
processing, during a second track read operation period following the first track read operation period and using the error correction codes:

the second plurality of data sectors and the error correction data for the second plurality of data sectors to attempt to decode the second plurality of data sectors; and a portion of the first plurality of data sectors and the error correction data read during the first track read operation for the first plurality of data sectors to continue to attempt to decode the first plurality of data sectors.

12. The method of claim 11, wherein:
the first data track and the second data track are sequential data tracks of the plurality of data tracks;
the first data track includes a first plurality of parity sectors comprising at least a portion of the error correction data for the first plurality of data sectors; and
the second data track includes second plurality of parity sectors comprising at least a portion of the error correction data for the second plurality of data sectors.

13. The method of claim 11, wherein:
processing, during the first track read operation period, the first plurality of data sectors and the error correction data for the first plurality of data sectors includes processing the first plurality of data sectors at least once for the first data track;
processing, during the second track read operation period, the second plurality of data sectors and the error correction data for the second plurality of data sectors includes processing the second plurality of data sectors at least once for the second data track; and
processing, during the second track read operations period, the portion of the first plurality of data sectors and the error correction data read during the first track read operation for the first plurality of data sectors includes selectively postprocessing the portion of the first plurality of data sectors.

14. The method of claim 13, further comprising:
determining a failed sectors threshold for postprocessing, wherein the portion of the first plurality of data sectors failed to be decoded during the first track read operation period; and
comparing the portion of the first plurality of data sectors to the failed sectors threshold to determine whether to selectively postprocess the portion of the first plurality of data sectors during the second track read operation period.

15. The method of claim 14, wherein:
the failed sectors threshold is a number of failed sectors that do not exceed a parallel processing capability for postprocessing the portions of the first plurality of data sectors during the second track read operation period; and
comparing the portion of the first plurality of data sectors includes comparing a number of failed sectors in the portion of the first plurality of data sectors to the failed sectors threshold.

16. The method of claim 14, further comprising:
positioning, during the first track read operation period, a read head over first data track to receive the read signal for the first data track; and
responsive to the portion of the first plurality of data sectors meeting the failed sectors threshold:
maintaining the read head on the first data track for a next revolution of the storage medium; and
continuing the first track read operation period for processing the first plurality of data sectors using error correction codes.

17. The method of claim 14, further comprising:
positioning, during the first track read operation period, a read head over first data track to receive the read signal for the first data track;
positioning, during the second track read operation period, the read head over the second data track to receive the read signal for the second data track;
determining a time threshold for postprocessing the portion of the first plurality of data sectors;
determining an elapsed time from a start of the second track read operation period; and
selectively returning, responsive to the elapsed time meeting the time threshold, the read head to the first data track for a next revolution of the storage medium for a recovery read operation on the first data track.

18. The method of claim 14, further comprising:
positioning, during the first track read operation period, a read head over first data track to receive the read signal for the first data track;
positioning, during the second track read operation period, the read head over the second data track to receive the read signal for the second data track;
storing, in a read channel memory, an in-process plurality of data sectors, wherein the in-process plurality of data sectors includes data sectors from the first plurality of data sectors and the second plurality of data sectors;
determining available memory in the read channel memory; and
selectively maintaining, responsive to determining insufficient memory is available, the read head on the second data track for a next revolution of the storage medium.

19. The method of claim 18, further comprising:
positioning, during the first track read operation period, a read head over first data track to receive the read signal for the first data track;
positioning, during the second track read operation period, the read head over the second data track to receive the read signal for the second data track, wherein:
the plurality of data tracks is configured as continuous data tracks having a track length shorter than an integer number of revolutions; and
the second data track follows the first data track; and
selectively skewing the read head to maintain the read head on a prior data track for a next revolution for additional processing time for the second track read operation period.

20. A data storage device comprising:
a storage medium comprising a plurality of data tracks;
means for receiving a read signal for a first data track of a plurality of data tracks on a storage medium, wherein the first data track includes a first plurality of data sectors and error correction data for the first plurality of data sectors;
means for receiving a read signal for a second data track of the plurality of data tracks, wherein:
the second data track includes a second plurality of data sectors and error correction data for the second plurality of data sectors;
the second data track is different than the first data track; and
the read signal for the second data track is received after the read signal for the first data track;
means for processing, during a first track read operation period and using error correction codes, the first plurality of data sectors and the error correction data for the first plurality of data sectors to attempt to decode the first plurality of data sectors; and means for processing, during a second track read operation period following the first track read operation period and using the error correction codes:
   the second plurality of data sectors and the error correction data for the second plurality of data sectors to attempt to decode the second plurality of data sectors; and
   a portion of the first plurality of data sectors and the error correction data read during the first track read operation for the first plurality of data sectors to continue to attempt to decode the first plurality of data sectors.

21. A data storage device, comprising:
a storage medium comprising a plurality of data tracks;
a channel circuit configured to:
   receive a read signal for a first data track of the plurality of data tracks, wherein the first data track includes a first plurality of data sectors;
   receive a read signal for a second data track of the plurality of data tracks, wherein:
      the second data track includes a second plurality of data sectors;
      the second data track is different than the first data track; and
      the read signal for the second data track is received after the read signal for the first data track;
   process, during a first track read operation period, the first plurality of data sectors using error correction codes; and
   process, during a second track read operation period following the first track read operation period, the second plurality of data sectors and a portion of the first plurality of data sectors using the error correction codes; and
a servo controller configured to controllably position a read head over the plurality of data tracks on the storage medium, wherein:
   the plurality of data tracks is configured as continuous data tracks having a track length shorter than an integer number of revolutions; and
   the channel circuit is further configured to selectively cause the servo controller to skew the read head to maintain the read head on a prior data track for a next revolution for additional processing time.

* * * * *